(12) United States Patent
Lundberg

(10) Patent No.: US 10,121,453 B2
(45) Date of Patent: Nov. 6, 2018

(54) BIT RATE CONTROLLER AND A METHOD FOR LIMITING OUTPUT BIT RATE

(71) Applicant: Axis AB, Lund (SE)

(72) Inventor: Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 14 days.

(21) Appl. No.: 15/374,532

(22) Filed: Dec. 9, 2016

(65) Prior Publication Data
US 2017/0169797 A1 Jun. 15, 2017

(30) Foreign Application Priority Data

Dec. 15, 2015 (EP) ..................................... 15200115

(51) Int. Cl.
| | | |
|---|---|---|
| *G06K 9/46* | (2006.01) | |
| *G09G 5/10* | (2006.01) | |
| *H04N 19/115* | (2014.01) | |
| *H04N 19/136* | (2014.01) | |
| *H04N 19/179* | (2014.01) | |

(Continued)

(52) U.S. Cl.
CPC .............. *G09G 5/10* (2013.01); *H04N 19/115* (2014.11); *H04N 19/136* (2014.11); *H04N 19/179* (2014.11); *G09G 2320/0626* (2013.01); *H04N 19/167* (2014.11); *H04N 19/23* (2014.11); *H04N 19/86* (2014.11)

(58) Field of Classification Search
CPC .. H04N 19/115; H04N 19/136; H04N 19/179; H04N 19/167; H04N 19/23; H04N 19/86; G09G 5/10; G09G 2320/0626
See application file for complete search history.

(56) References Cited

U.S. PATENT DOCUMENTS 4,969,045 A * 11/1990 Haruki ................. H04N 5/2351
348/229.1
5,134,487 A * 7/1992 Taguchi ............... H04N 1/2112
348/384.1
(Continued)

FOREIGN PATENT DOCUMENTS

EP          1949705 A2      7/2008
KR     10-2007-0051184      5/2007

OTHER PUBLICATIONS

The Extended European Search Report issued for the corresponding EP Application No. 15200115.2, dated May 3, 2016, 8 pages.
(Continued)

*Primary Examiner* — Ali Bayat
(74) *Attorney, Agent, or Firm* — Snyder, Clark, Lesch & Chung, LLP

(57) ABSTRACT

The present invention relates to a bit rate controller comprising: a light determination block configured to determine a light level in images of a captured scene; and a maximum bit rate setting block. The maximum bit rate setting block is configured to: upon the light level being determined to be a low light level, set a low-light maximum bit rate; upon the light level being determined to be an intermediate light level, set an intermediate-light maximum bit rate; or upon the light level being determined to be a high light level, set a high-light maximum bit rate. The low-light maximum bit rate is lower than the intermediate-light maximum bit rate. The high-light maximum bit rate is lower than the intermediate-light maximum bit rate.

20 Claims, 2 Drawing Sheets

(51) Int. Cl.
  *H04N 19/23*  (2014.01)
  *H04N 19/167*  (2014.01)
  *H04N 19/86*  (2014.01)

(56) References Cited

U.S. PATENT DOCUMENTS

| | | | |
|---|---|---|---|
| 7,099,510 B2 | 8/2006 | Jones et al. | |
| 8,121,424 B2 | 2/2012 | Almbladh | |
| 8,260,019 B2* | 9/2012 | Chandra | A61B 6/035 |
| | | | 378/19 |
| 9,076,224 B1* | 7/2015 | Shah | G06T 5/009 |
| 2002/0006230 A1* | 1/2002 | Enomoto | G06T 5/009 |
| | | | 382/261 |
| 2004/0008772 A1 | 1/2004 | Kojima | |
| 2015/0172681 A1* | 6/2015 | Kim | G06F 19/321 |
| | | | 382/128 |
| 2015/0350483 A1* | 12/2015 | Holtsberg | H04N 1/2112 |
| | | | 348/231.2 |
| 2017/0249881 A1* | 8/2017 | Furihata | G09G 3/003 |

OTHER PUBLICATIONS

Architect & Engineer Specification: Section 28 23 29 Video Surveillance Remote Devices and Sensors: SNC-EB632R Outdoor IR Bullet Full High Definition (FHD) Network Camera Powered by IPELA ENGINE EX (Software version 2.1.0 or later); no date available, 28 pages.
Optimizing Bandwidth for Megapixel Camera; retrieved online Oct. 13, 2015, 4 pages.
Honovich, J.: The Truth About IR Lighting and Bandwidth. IPVM posted on Aug. 13, 2011, retrieved online Oct. 13, 2015, 6 pages.
Axis Communications: Q6032-E bitrate at night (low light). Axis Customer Forum, retrieved online Oct. 13, 2015, 2 pages.

\* cited by examiner

BIT RATE CONTROLLER AND A METHOD FOR LIMITING OUTPUT BIT RATE

RELATED APPLICATION

This application claims priority under 35 U.S.C. § 119 based on European Patent Application No. 15200115.2, filed Dec. 15, 2015, the disclosure of which is hereby incorporated by reference herein.

TECHNICAL FIELD

The present invention relates to limiting of output bit rate.

BACKGROUND

When sending digital video data, compression of the digital video data is used for reducing the bit rate of the digital video data.

The bit rate may be controlled by setting a predetermined constant bit rate. This will result in that parts of the digital video data where the degree of detail and/or motion in the captured scene is relatively low will risk being compressed in an unnecessarily small degree, resulting in that the compressed digital video data is taking up unnecessarily high amounts of bandwidth and/or storage space. Moreover, this will also result in that parts of the digital video data where the degree of detail and/or motion in the captured scene is relatively high will risk being compressed in a too large degree, resulting in that the image quality of the compressed digital video data is compromised.

Alternatively, the bit rate may be controlled by setting a maximum bit rate used for keeping the bit rate close to or below the predetermined maximum. The predetermined maximum is implemented as a fixed parameter in a bit rate controller. A relatively high predetermined maximum bit rate may require a large bandwidth and/or storage for the digital video data, whereas a relatively low predetermined maximum bit rate will risk compromising the image quality of the digital video data when there is a lot of detail or motion in the captured scene.

Yet alternatively, the bit rate controller may employ variable bit rate, which may also be referred to as constant quality, where the bit rate is allowed to vary in order to maintain a certain image quality. This may lead to a too high usage of bandwidth when there is a lot of detail or motion in the scene. Moreover, this may lead to a very high bit rate at low light conditions capturing the digital video data. A high gain on the signal from the image sensor will be needed for capturing the digital video data in low light conditions. This will result in a lot of noise in the digital video data, which requires large amounts of bits for encoding.

SUMMARY OF THE INVENTION

It is an object of the present invention to solve at least one of the problems mentioned above.

According to a first aspect a method for setting bit rate is provided. The method comprises: determining a light level in images of a captured scene, wherein a light level scale is discretized into a plurality of distinct light levels comprising at least a low light level, an intermediate light level and a high light level, and wherein a maximum bit rate is associated with each respective distinct light level; upon the light level being determined to be the low light level, setting a low-light maximum bit rate; upon the light level being determined to be the intermediate light level, setting an intermediate-light maximum bit rate; or upon the light level being determined to be the high light level, setting a high-light maximum bit rate; wherein the low-light maximum bit rate is lower than the intermediate-light maximum bit rate and wherein the high-light maximum bit rate is lower than the intermediate-light maximum bit rate.

According to the present invention, a variable maximum bit rate is used, which is dependent on the light level in an image of the digital video data that is to be encoded. In this manner, the maximum bit rate may be set such that a smaller portion of a constant quality bit rate is allowed at intermediate light levels, e.g., dusk or dawn, and a larger portion of the constant quality bit rate is allowed in "complete darkness", and particularly at high light levels. In an intermediate light situation, there will be a lot of noise, leading to high bit rates if a constant quality bit rate is used. If the maximum bit rate is set too low in such a situation, the quality of the images will be low and actual movement in the scene may risk being interpreted as noise. However, if the maximum bit rate is set higher, in order to allow a higher quality of the noisy images, the limit may be unnecessarily high for an essentially "completely dark" scene. For an essentially "completely dark" scene, a lot of the pixels will be clipped to black, meaning that there is little variation and noise. Images of such a scene may therefore not need severe compression for fitting within the bit rate limit. Still, high quality in an essentially "completely dark" image is of little use to the viewer, so the bits are not that wisely spent. For storage, that is important all in itself. For transmission it may, e.g., be significant if there are also other units sending digital video data, e.g. video cameras, in a system of units arranged to send digital video data, which might at the same time benefit more from a higher bit rate limit.

A light level scale may be discretized into a plurality of distinct light levels, wherein a maximum bit rate is associated with each respective distinct light level. The difference in light level between two adjacent distinct light levels may be at most a doubling of the light level.

The light level in the images may at least partly be determined by using image sensor data of an image sensor capturing the images or a dedicated light level sensor. The word "light level" should be construed as the amount of light measured in a plane, typically the plane of the image sensor capturing the images. Another word used for light level is illuminance. The light level may be measured directly, using the dedicated sensor, or indirectly, using image sensor data. The latter may be implemented by having a look-up table translating a gain setting of the image sensor used for capturing the images into a light level.

Upon the light level being determined to be the low light level, a first low-light maximum bit rate may be set for parts of an image identified as foreground and a second low-light maximum bit rate may be set for parts of the image identified as background; upon the light level being determined to be the intermediate light level, a first intermediate-light maximum bit rate may be set for parts of the image identified as foreground and a second intermediate-light maximum bit rate may be set for parts of the image identified as background; or upon the light level being determined to be a high light level, a first high-light maximum bit rate may be set for parts of the image identified as foreground and a second high-light maximum bit rate may be set for parts of the image identified as background; wherein the first low-light maximum bit rate is lower than the first intermediate-light maximum bit rate and wherein the first high-light maximum bit rate is lower than the first intermediate-light maximum bit rate. In this manner, differentiated maximum bit rates may be set for the foreground and the background of the image. For instance, fewer bits may be spent on the background, which might be of less importance for a viewer, and more bits may be spent on the foreground, such that moving objects or people may be depicted more clearly.

The second low-light maximum bit rate may be lower than the second intermediate-light maximum bit rate and the second high-light maximum bit rate may be lower than the second intermediate-light maximum bit rate. Alternatively, the second low-light maximum bit rate, the second intermediate-light maximum bit rate and the second high-light maximum bit rate may be set to be the same maximum bit rate.

According to a second aspect a non-transitory computer-readable recording medium is provided, having recorded thereon a program for implementing any of the above methods when executed on a device having processing capabilities.

According to a third aspect a bit rate controller is provided. The bit rate controller comprises: a light determination block configured to determine a light level in images of a captured scene; and a maximum bit rate setting block. The light determination block is configured to determine the light level in images of the captured scene based on light level during capturing of the images, wherein a light level scale is discretized into a plurality of distinct light levels comprising at least a low light level, an intermediate light level and a high light level, and wherein a maximum bit rate is associated with each respective distinct light level. The maximum bit rate setting block is configured to: upon the light level being determined to be a low light level, set the low-light maximum bit rate; upon the light level being determined to be the intermediate light level, set an intermediate-light maximum bit rate; or upon the light level being determined to be the high light level, set a high-light maximum bit rate. Wherein the low-light maximum bit rate is lower than the intermediate-light maximum bit rate and wherein the high-light maximum bit rate is lower than the intermediate-light maximum bit rate.

The rate controller may further comprise a memory comprising a look-up table comprising the respective distinct light levels and the thereto associated predetermined maximum bit rates. The setting of the respective maximum bit rate may be performed by performing a look-up in the look-up table.

The bit rate controller may be arranged in a digital video camera.

The bit rate controller may be configured to service a plurality of digital network cameras, each digital network camera being configured to capture images depicting a camera specific scene, wherein the noise determination block is configured to camera specifically determine the light level in the images of each camera specific scene, and wherein the maximum bit rate setting block is configured to set camera specific low-light maximum bit rates, intermediate-light maximum bit rates and high-light maximum bit rates.

The bit rate controller may further be configured to change the camera specific low-light maximum bit rates, intermediate-light maximum bit rates and high-light maximum bit rates over time based on determined activity in the camera specific scenes. The change may be based on determined activity in the camera specific scenes. Alternatively or in combination, in a system of many cameras, the change may be based on bit rates of the encoded streams outputted by the different cameras. Thereby, a bit rate distribution in a system of cameras may be adapted to the needs of the different cameras over time.

The above mentioned features of the method, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
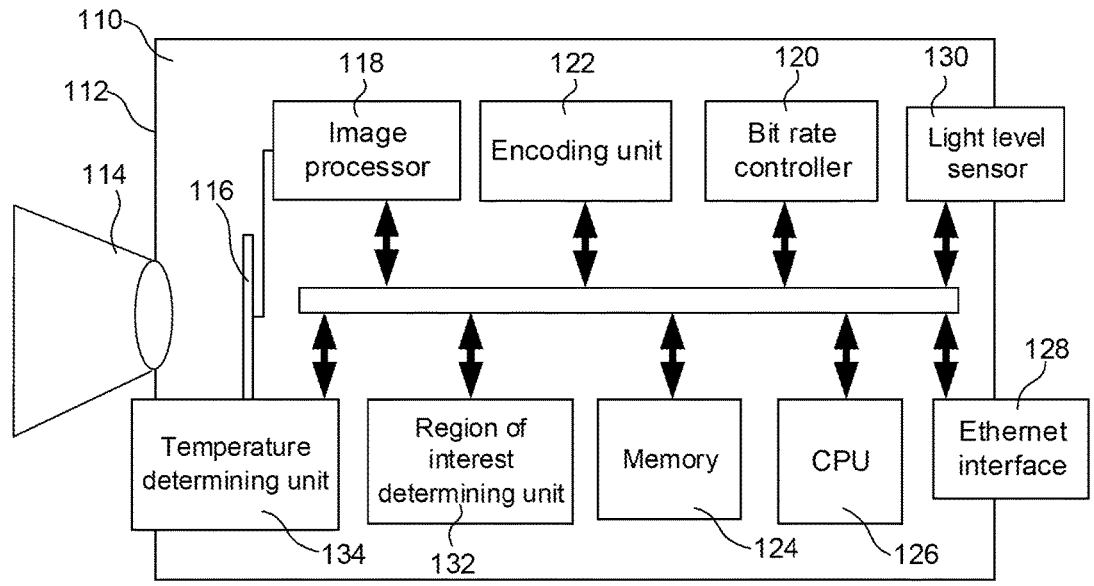
FIG. 1 schematically illustrates a digital network camera arranged to capture digital video data depicting a scene.

FIG. 1 illustrates a digital network camera 100 arranged to capture digital video data depicting a scene. The digital network camera 100 is arranged to capture and process (and possibly also store) the digital video data. The digital network camera 100 comprises a housing 112, a lens 114, an image sensor 116, an image processing unit 118, a bit rate controller 120, an encoding unit 122, a memory 124, a CPU 126 and an network interface 128. Any one of the image processing unit 118, the rate controller 120 and/or encoding unit 122 may be implemented as hardware and/or software.

The digital network camera 100 is arranged to be connected to a digital network such as the Internet or a Local Area Network (LAN) via the network interface 128. The connection to the digital network may be wired or wireless. Thus, the network interface 128 may be a network port adapted to 10/100/1000 Mbps data traffic, such as an Ethernet port, a modular port being arranged to receive a modular connector, e.g., a RJ45 connector. Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

The camera components, i.e. the lens 114 and the image sensor 116, may be arranged to capture raw images wherein each raw image can be described as light of different wavelengths and originating from different objects and parts of objects. These raw images are then converted from analog to digital format and transferred into the image processing unit 118. According to this embodiment the digital network camera 110 is a camera arranged to capture photographic images.

Alternatively or in combination, the image sensor 116 of the digital network camera 110 may be arranged to capture thermal images.

Hence, the digital video data captured by the digital network camera 110 may be a representation of photographic images, a representation of thermal images or a combination thereof.

The encoding unit 122 is arranged to encode the digital video data using video encoding. Non-limiting examples of video encoding are video encoding standards of the ISO/MPEG or ITU-H.26X families. The encoding unit 122 is arranged to encode images of the captured digital video data into images in an encoded version of the captured digital video data, henceforth referred to as the encoded digital video data.

The encoded digital video data may be directly transmitted over a digital network via the network interface 128. Alternatively, the encoded digital video data may be stored in the memory 124 for later transmission, via the network interface 128, over the digital network. The memory 124 may be any kind of volatile or non-volatile memory. Further, the memory 124 may comprise a plurality of memory members. At least one of the plurality of memory members may be used as a buffer memory.

In order to limit the amount of data of the encoded digital video data the bit rate of the encoded digital video data is controlled by means of the bit rate controller 120. Examples of bit rate controlling methods are using a constant bit rate, a maximum bit rate or a variable (constant quality) bit rate. Using maximum bit rate, a predefined limit is used for keeping the bit rate close to or below a certain predetermined threshold. The limit is implemented as a fixed parameter to the bit rate controller 120. A high limit will require large bandwidth and/or storage, whereas a low limit will risk compromising image quality when there is a lot of detail or motion in the captured scene. Using variable bit rate, sometimes referred to as constant quality bit rate, the bit rate controller 120 is arranged to vary the bit rate such that a certain image quality is maintained. This may lead to a too high usage of bandwidth when there is a lot of detail or motion in the scene. Moreover, this may lead to a very high bit rate at intermediate light conditions (wherein intermediate light conditions, e.g., correspond to dusk or dawn), or at intermediate thermal radiation conditions in the case of thermal imaging. A high gain on the signal from the image sensor 116 will be needed for capturing the digital video data at intermediate light conditions, or at intermediate thermal conditions. This will result in a lot of noise in comparison with the real signal in the digital video data, i.e. a low signal-to-noise ratio (SNR), which requires large amounts of bits for encoding. For example, using variable bit rate, the highest bitrates will be produced during intermediate light conditions. When it is really dark, low light level conditions, a lot of the image content will be clipped to black, but when the light level is slightly higher (intermediate light levels), noise and details will raise the output bit rate significantly.

Hence, the relative noise level in the digital video data rises when there is intermediate light level or intermediate heat radiation in the scene; this because a high gain on the image sensor 116 is needed for capturing the scene, and details that would have been clipped to black at a lower light level or heat radiation start appearing.

According to the present invention, a variable maximum bit rate is used, which is dependent on the light level in an image of the digital video data that is to be encoded. For photographic images the noise is low at low light levels and noise increases with increasing light level. As the light level thereafter continues to rise, the need for gain decreases, and thereby the noise also decreases. Hence, the amount of data to encode is not directly proportional to the light level, as some details can be clipped to black if the signal is below certain thresholds. Similarly, for thermal images at low heat radiation levels the amount of noise is low because of clipping, and noise increases with increasing heat radiation level. As the heat radiation level thereafter continues to rise, the need for gain decreases, and thereby the noise also decreases.

Figure 2:
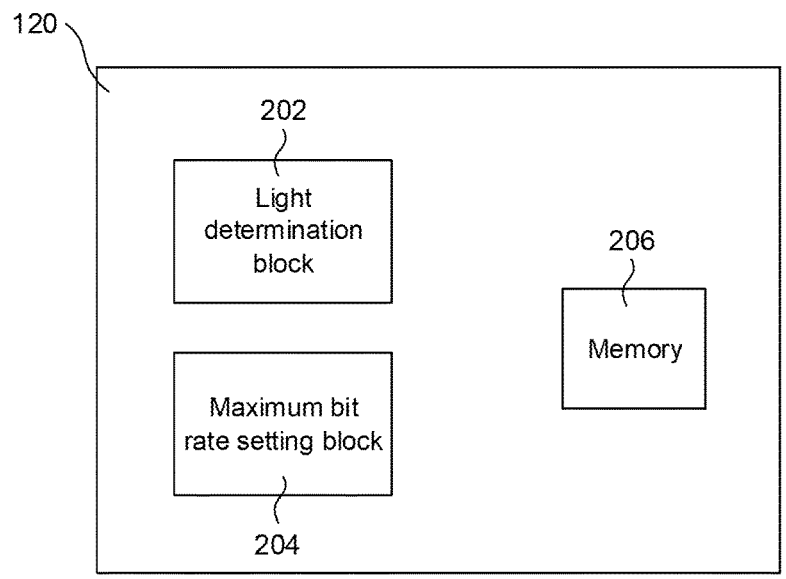
FIG. 2 schematically illustrates a bit rate controller arranged to limit output bit rate.

The bit rate controller 120 is arranged to control the bit rate of the encoded digital video data. The bit rate controller 120 may be hardware implemented, software implemented or a combination thereof. In FIG. 2 an embodiment of a bit rate controller 120 is illustrated. The bit rate controller 120 comprises a light determination block 202 and a maximum bit rate setting block 204.

The light determination block 202 is arranged to determine a light level in images captured by the digital network camera 110. The noise determination block 202 may be arranged to determine the light level by using image sensor data or a dedicated light level sensor 130 of the digital network camera 110. The former may be implemented by having a look-up table translating intensities measured by the pixels of the image sensor 116, e.g., luminance data after translation to a YCbCr colour space, into light levels. The light level may also be indirectly determined in that the light levels may be related to the number of gain steps from maximum gain. Intermediate light may be less than 4 gain steps from maximum gain. High light may be less gain than 8 gain steps from no gain. It shall be noted that gain steps are defined by the hardware amplifier and can be a few or many The dedicated light level sensor 130 is arranged to measure incoming photons, just like the image sensor 116, but typically the dedicated light level sensor 130 has a wider specially designed lens. The wider specially designed lens may, e.g., be arranged to capture the amount of light in a whole room. The readout data from the dedicated light level sensor 130 may then be translated into light levels using a look-up table. Normally, such a look-up table is non-linear.

The dedicated light level sensor 130 is typically arranged to indicate a suitable ISO value. A look-up table may then be used for determining which gain value corresponds to the indicated ISO value for the specific image sensor. Alternatively or in combination, the light determination block 202 may be arranged to determine the light level in the images by measuring or estimating noise in the signal provided by the image sensor 116. The noise in the signal provided by the image sensor 116 after it has been digitized comprises both fixed and dynamic noise. Fixed noise may be filtered away by means of a noise filter. However, it may be beneficial to measure the noise before noise filtering. If the noise is high, objects entering the scene may be mistaken for noise. The risk of mistaking objects for noise is reduced if the noise is measured before filtering.

Similarly, in case of thermal imaging the light determination block 202 may be arranged to determine the heat radiation level in the images by using image sensor data or a dedicated heat radiation sensor and/or by measuring or estimating noise in the signal provided by the image sensor 116.

Depending on the light level determined by the light determination block 202 the maximum bit rate setting block 204 is configured to set different maximum bit rates. A light level scale is discretized into a plurality of distinct light levels. A predetermined maximum bit rate is associated with each respective distinct light level. The distinct light levels are categorized into at least a low, an intermediate and a high light level. Upon the light level being determined to be a low light level, the maximum bit rate is set to a low-light maximum bit rate. Upon the light level being determined to be an intermediate light level, the maximum bit rate is set to an intermediate-light maximum bit rate. Upon the light level being determined to be a high light level, the maximum bit rate is set to a high-light maximum bit rate. The low-light maximum bit rate is lower than the intermediate-light maximum bit rate. The high-light maximum bit rate is lower than the intermediate-light maximum bit rate.

Similarly, in case of thermal imaging the maximum bit rate setting block 204 is configured to set different maximum bit rates depending on the heat radiation level. A heat radiation level scale is discretized into a plurality of distinct heat radiation levels. A predetermined maximum bit rate is associated with each respective distinct heat radiation level. The distinct heat radiation levels are categorized into at least a low, an intermediate and a high heat radiation level. Upon the heat radiation level being determined to be a low heat radiation level, the maximum bit rate is set to a low heat radiation maximum bit rate. Upon the heat radiation level being determined to be an intermediate heat radiation level, the maximum bit rate is set to an intermediate heat radiation maximum bit rate. Upon the heat radiation level being determined to be a high heat radiation level, the maximum bit rate is set to a high heat radiation maximum bit rate. The low heat radiation maximum bit rate is lower than the intermediate heat radiation maximum bit rate. The high heat radiation maximum bit rate is lower than the intermediate heat radiation maximum bit rate.

The digital network camera 110 may also comprise a region of interest determining unit 132. The region of interest determining unit 132 is arranged to identify a foreground part in the images of the digital video data as containing relevant information and to identify a background part of the images of the digital video data as containing non-relevant information. Non-limiting examples of foreground parts are parts comprising motion or parts comprising objects of specific interest, e.g., a face, a car, a license plate. For example, an intelligent compression scheme, such as AXIS Zipstream, may be used for indentifying foreground and background parts.

Hence, upon the light level being determined to be a low light level, a first low-light maximum bit rate may be set for parts of an image identified as foreground and a second low-light maximum bit rate is set for parts of the image identified as background. Upon the light level being determined to be an intermediate light level, a first intermediate-light maximum bit rate may be set for parts of an image identified as foreground and a second intermediate-light maximum bit rate is set for parts of the image identified as background. Upon the light level being determined to be a high light level, a first high-light maximum bit rate may be set for parts of an image identified as foreground and a second high-light maximum bit rate is set for parts of the image identified as background. The first low-light maximum bit rate is lower than the first intermediate-light maximum bit rate. The first high-light maximum bit rate is lower than the first intermediate-light maximum bit rate. The second low-light maximum bit rate may be lower than the second intermediate-light maximum bit rate. The second high-light maximum bit rate may be lower than the second intermediate-light maximum bit rate. Alternatively, the second low-light maximum bit rate, the second intermediate-light maximum bit rate and the second high-light maximum bit rate are set to be the same maximum bit rate, i.e. the same maximum bit rate is set for the background regardless of light level.

Accordingly, different bit rates may be used for parts identified as background and as foreground. For instance, a constant maximum bit rate may be used for the background, and a variation of the maximum bit rate as a function of the light level may be used for the foreground. Alternatively, varying maximum bit rates as a function of the light level may be used for the background as well as for the foreground, however, the maximum bit rates as a function of the light level are different for the background as compared with the foreground.

Division of the scene into foreground and background may also be made in more steps. Moreover, one maximum bit rate could be set for the foreground and another maximum bit rate for the background, and a smoothing function may be used at the borders there between in order to avoid sharp quality transitions in the images.

What is said above for foreground and background of the scene in photographic images may also be implemented in connection with thermal imaging. For thermal imaging it is the heat radiation level and its discretization into low, intermediate and high levels that is used instead of the light level.

The bit rate controller 120 may further comprise a memory 206. The memory 206 may be a dedicated memory for the bit rate controller 120. Alternatively or in combination, the memory may be the memory 124 of the digital network camera 110. The memory 206 may comprise a look-up table comprising predetermined maximum bit rates and thereto associated respective distinct light or heat radiation levels. Hence, the setting of the respective maximum bit rate may be performed by performing a look-up in the look-up table. The difference in light or heat radiation level between two adjacent distinct light or heat radiation levels may be at most a doubling of the light or heat radiation level. In case a determined light or heat radiation level does not correspond to a distinct light or heat radiation level of the distinct light or heat radiation levels in the look-up table, the distinct light or heat radiation level closest to the determined light or heat radiation level may be used for finding the predetermined maximum bit rate. Alternatively, an interpolation using values of the look-up table may be used for finding a maximum bit rate.

The digital network camera 110 may also comprise a temperature determining unit 134. The temperature determining unit 134 is arranged to determine a temperature of the image sensor 116 capturing the images. The temperature determining unit 134 may comprise a temperature sensor configured to measure the temperature of the image sensor 116 on or next to the image sensor 116. Hence, the temperature determining unit 134 may be arranged to directly measure the temperature of the image sensor 116. Alternatively, the temperature determining unit 134 may comprise a temperature sensor arranged at the housing 112 of the digital network camera 110. The temperature sensor at the housing 112 of the digital network camera 110 may be configured to measure an interior temperature of the digital network camera 110 and/or an ambient temperature outside the digital network camera 110. The interior temperature and/or the ambient temperature may then be used by the temperature determining unit 134 for estimating the temperature of the image sensor 116. The determined temperature of the image sensor 116 is indicative of heat induced noise at the image sensor 116. The temperature of the image sensor 116 may be used for determining the noise level in images of a captured scene. The noise level may in this case be caused by the temperature of the image sensor 116 in combination with the light level or the heat radiation level within the scene. Thus, the setting of the respective maximum bit rate may also be based on the temperature of the image sensor when capturing the image.

Figure 3:
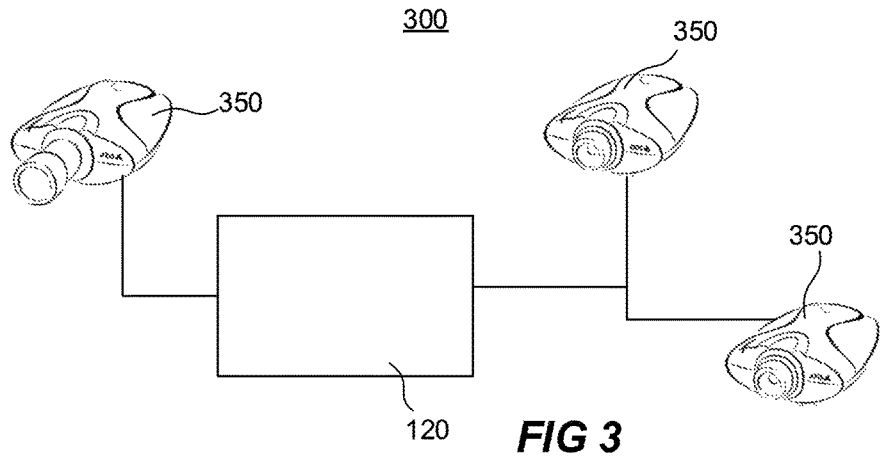
FIG. 3 illustrates a system of a plurality of digital network cameras connected to a bit rate controller.

FIG. 3 illustrates a system 300 of a plurality of digital network cameras 350 connected to a bit rate controller 120. Each digital network camera 350 is configured to capture images depicting a camera specific scene. The plurality of digital network cameras 350 and the bit rate controller 120 are connected to each other in a computer network. The bit rate controller 120 may be arranged as a specific device as illustrated in FIG. 3. Alternatively, the bit rate controller 120 may be arranged in one of the plurality of digital network cameras 350. The bit rate controller 120 is configured to service the plurality of digital video cameras 350. The noise determination block 202 is configured to camera specifically determine the light level in the images of each camera specific scene. A camera specific light level scale is set for each specific camera. Each camera specific light level scale is discretized into a plurality of distinct camera specific light levels. A camera specific predetermined maximum bit rate is associated with each respective camera specific distinct light level. The camera specific distinct light levels are categorized into at least a low, an intermediate and a high light level. Hence, based on the camera specifically determined light levels in the images of each camera specific scene the maximum bit rate setting block 204 is configured to set camera specific low-light maximum bit rates, camera specific intermediate-light maximum bit rates and camera specific high-light maximum bit rates.

Alternatively, the system may be implemented having one camera-specific bit rate controller in each camera and then one system bit rate controller separately arranged, or arranged in one of the cameras.

The bit rate controller may further be configured to change the camera specific low-light maximum bit rates, the camera specific intermediate-light maximum bit rates and the camera specific high-light maximum bit rates over time. The change may be based on determined activity in the camera specific scenes. Alternatively or in combination, in a system of many cameras, the change may be based on bit rates of the encoded streams outputted by the different cameras. That is even if there is a maximum bit rate set at each camera, bit rate of the outputted video stream may vary below that maximum bit rate. If one camera is more often below its maximum bit rate and another camera is more often on the maximum bit rate, bit allocation could be distributed differently among the cameras of the system of cameras.

The activity in each camera specific scene may, e.g., be determined by a motion detection algorithm. The motion detection algorithm may be performed in motion detection software and/or hardware. The motion detection software and/or hardware may be implemented in one or more of the plurality of digital network cameras 350. Alternatively or in combination, the motion detection software and/or hardware may be implemented in the bit rate controller 120. The video motion detection algorithm is preferably based on spatio-temporal video analysis. Some examples of video motion detection algorithms possible to use are:

An algorithm based on "change detection". According to such algorithms an image is compared with a previous image pixel-by-pixel in order to find pixels changing between the image and the previous image.

An algorithm based on "motion detection". According to such algorithms an image is compared with a previous image filtering out "real" motion from for example illumination changes. This can for example be performed by applying spatio-temporal video analysis; Almbladh is for example describing a method for spatio-temporal video analysis in U.S. Pat. No. 8,121,424.

An algorithm based on "object motion detection" and "object classification". According to such algorithms the detected motion is analyzed to detect moving objects which are tracked so that objects that have been in motion but are temporarily standing still are detected. Hence, according to such algorithms the objects may, e.g., be analyzed and classified as for example "human", "vehicle", "car", "animal", "face", etc. In order to classify objects the method of Viola and Jones described in U.S. Pat. No. 7,099,510 may be used.

The different algorithms mentioned above typically build on each other to step-wise achieve a higher degree of complexity and reliability.

Hence, the above described system 300 may e.g. be used for measuring, over a longer time (e.g., 24 hours or a week), the activity in the different camera specific scenes and set the different camera specific maximum bit rates depending on the activities. For instance, if there is often activity in just one or a few camera specific scenes, the maximum bit rates for the corresponding digital network cameras 350 may be raised for those digital network cameras 350 in comparison with other digital network cameras 350 in the system 300.

What is discussed above in connection with camera specific light levels and light level scales also apply for camera specific heat radiation levels and heat radiation scales.

Figure 4:
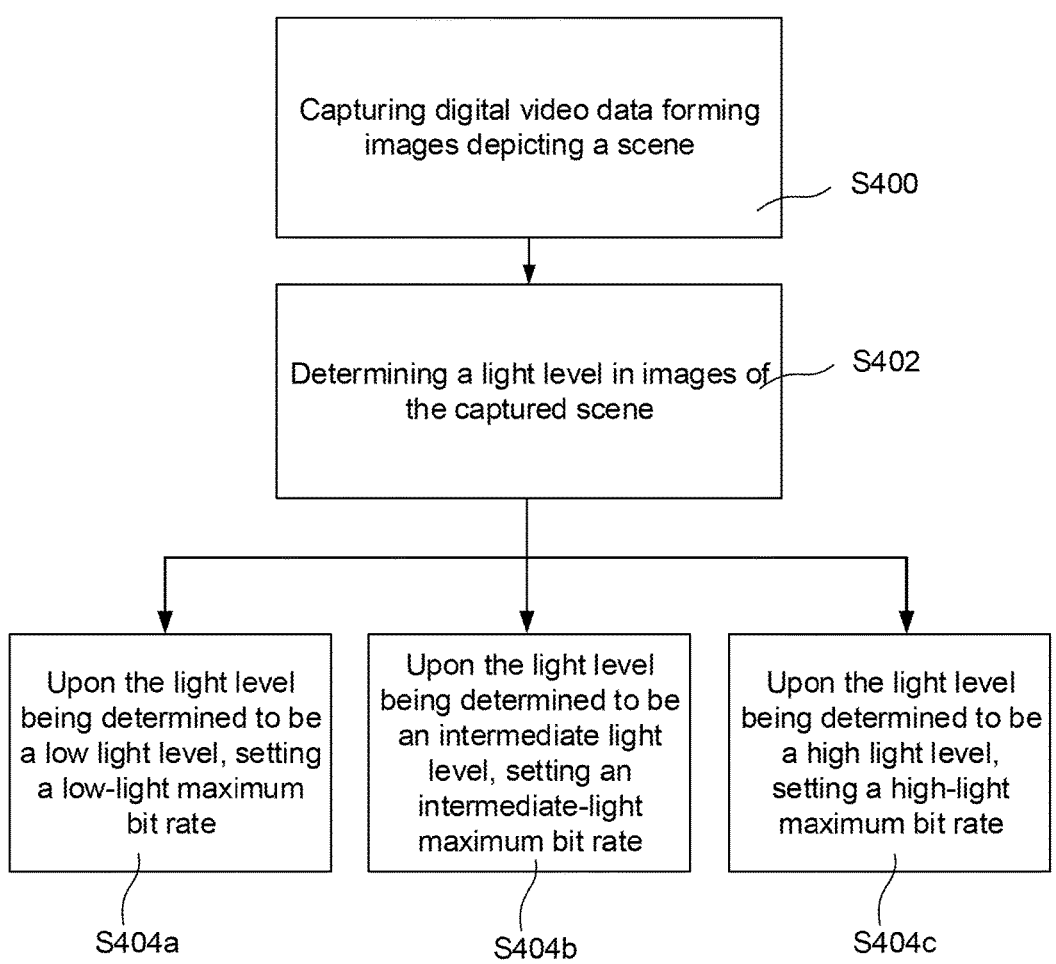
FIG. 4 is a block scheme of a method for limiting output bit rate.

FIG. 4 illustrates a method for limiting output bit rate of a video encoder. The method comprises the following acts. Determining, S402, a light level in images of a captured scene. Upon the light level being determined to be a low light level, setting, S404a, a low-light maximum bit rate. Upon the light level being determined to be an intermediate light level, setting, S404b, an intermediate-light maximum bit rate. Upon the light level being determined to be a high light level, setting, S404c, a high-light maximum bit rate.

The low-light maximum bit rate is lower than the intermediate-light maximum bit rate. The high-light maximum bit rate is lower than the intermediate-light maximum bit rate.

The method may further comprise capturing, S400, digital video data forming images depicting the scene. The capturing may preferably be performed by the image sensor 116 of the digital video camera 110. Alternatively, the capturing of the digital video data forming images depicting the scene may performed by an analog to digital converter converting an analog signal into the digital video data.

The light level in the images may at least partly be determined by using image sensor data of the image sensor 116 or the dedicated light level sensor 130. The noise level in the images may at least partly be determined by using a temperature of the image sensor 116. Hence, the noise level in the images may be a function of the temperature of the image sensor. Methods for determining the temperature of the image sensor 116 are discussed above.

The person skilled in the art realizes that the present invention by no means is limited to the preferred embodiments described above. On the contrary, many modifications and variations are possible within the scope of the appended claims.

For example, in most of the above mentioned exemplified embodiments the bit rate controller 120 is arranged in a digital video camera 110. However, it is realized that the bit rate controller 120 may be arranged in other devices as well. As a non-limiting example, the bit rate controller 120 may be arranged in an analog to digital converter arranged to convert analog video into digital video data.

Moreover, different digital video cameras may give different noise at the same light level, because of different day/night behavior. Some digital video cameras switch to night mode (IR cut filter switched off) earlier than others. In night mode the images of the scene are typically set to be black and white. In day mode the images of the scene are typically set to be in color, which leads to more noise at low light levels. Therefore, a digital video camera that switches to black and white at, e.g., 1.0 lux will give less noise at 0.95 lux than a camera that does not switch to black and white until at 0.90 lux. In an embodiment, the bit rate controller may be arranged to influence the day/night behavior of the digital video camera, by slightly shifting the switch between day and night modes. Care should be taken in order not to get an erratic behavior, quickly switching back and forth between day and night modes. Such switching between day and night modes may be annoying to an operator viewing the video, and may also lead to a clicking noise when the IR cut filter is moved.

Additionally, variations to the disclosed embodiments can be understood and effected by the skilled person in practicing the claimed invention, from a study of the drawings, the disclosure, and the appended claims.

The invention claimed is:

1. A method for setting a bit rate for encoding of digital video data, the method comprising:
determining a light level in photographic images of captured digital video data depicting a scene, wherein a light level scale is discretized into a plurality of distinct light levels comprising at least a low light level, an intermediate light level and a high light level, and wherein a maximum bit rate for encoding the digital video data is associated with each respective distinct light level;
upon the light level being determined to be:
the low light level, setting the bit rate for encoding the digital video data to a low-light maximum bit rate;
the intermediate light level, setting the bit rate for encoding the digital video data to an intermediate-light maximum bit rate; or
the high light level, setting the bit rate for encoding the digital video data to a high-light maximum bit rate;
wherein the low-light maximum bit rate is lower than the intermediate-light maximum bit rate and wherein the high-light maximum bit rate is lower than the intermediate-light maximum bit rate.

2. The method of claim 1, wherein a difference in light level between two adjacent distinct light levels is at most a doubling of the light level.

3. The method of claim 2, wherein the light level in the images is determined by using image sensor data of an image sensor capturing the images, or a dedicated light level sensor.

4. The method of any one of claim 3 wherein upon the light level being determined to be:
the low light level, a first low-light maximum bit rate is set for parts of an image identified as foreground and a second low-light maximum bit rate is set for parts of the image identified as background;
the intermediate light level, a first intermediate-light maximum bit rate is set for parts of an image identified as foreground and a second intermediate-light maximum bit rate is set for parts of the image identified as background; or
the high light level, a first high-light maximum bit rate is set for parts of an image identified as foreground and a second high-light maximum bit rate is set for parts of the image identified as background;
wherein the first low-light maximum bit rate is lower than the first intermediate-light maximum bit rate and wherein the first high-light maximum bit rate is lower than the first intermediate-light maximum bit rate.

5. The method of claim 4,
wherein the second low-light maximum bit rate is lower than the second intermediate-light maximum bit rate and wherein the second high-light maximum bit rate is lower than the second intermediate-light maximum bit rate, or
wherein the second low-light maximum bit rate, the second intermediate-light maximum bit rate and the second high-light maximum bit rate are set to be the same maximum bit rate.

6. The method of any one of claim 2, wherein upon the light level being determined to be:
the low light level, a first low-light maximum bit rate is set for parts of an image identified as foreground and a second low-light maximum bit rate is set for parts of the image identified as background;
the intermediate light level, a first intermediate-light maximum bit rate is set for parts of an image identified as foreground and a second intermediate-light maximum bit rate is set for parts of the image identified as background; or
the high light level, a first high-light maximum bit rate is set for parts of an image identified as foreground and a second high-light maximum bit rate is set for parts of the image identified as background;
wherein the first low-light maximum bit rate is lower than the first intermediate-light maximum bit rate and wherein the first high-light maximum bit rate is lower than the first intermediate-light maximum bit rate.

7. The method of claim 6, wherein the second low-light maximum bit rate is lower than the second intermediate-light maximum bit rate and wherein the second high-light maximum bit rate is lower than the second intermediate-light maximum bit rate.

8. The method of claim 6, wherein the second low-light maximum bit rate, the second intermediate-light maximum bit rate and the second high-light maximum bit rate are set to be the same maximum bit rate.

9. The method of claim 1, wherein the light level in the images is determined by using image sensor data of an image sensor capturing the images, or a dedicated light level sensor.

10. The method of any one of claim 9, wherein upon the light level being determined to be:
  the low light level, a first low-light maximum bit rate is set for parts of an image identified as foreground and a second low-light maximum bit rate is set for parts of the image identified as background;
  the intermediate light level, a first intermediate-light maximum bit rate is set for parts of an image identified as foreground and a second intermediate-light maximum bit rate is set for parts of the image identified as background; or
  the high light level, a first high-light maximum bit rate is set for parts of an image identified as foreground and a second high-light maximum bit rate is set for parts of the image identified as background;
  wherein the first low-light maximum bit rate is lower than the first intermediate-light maximum bit rate and wherein the first high-light maximum bit rate is lower than the first intermediate-light maximum bit rate.

11. The method of claim 10,
  wherein the second low-light maximum bit rate is lower than the second intermediate-light maximum bit rate and wherein the second high-light maximum bit rate is lower than the second intermediate-light maximum bit rate, or
  wherein the second low-light maximum bit rate, the second intermediate-light maximum bit rate and the second high-light maximum bit rate are set to be the same maximum bit rate.

12. The method of any one of claim 1, wherein upon the light level being determined to be:
  the low light level, a first low-light maximum bit rate is set for parts of an image identified as foreground and a second low-light maximum bit rate is set for parts of the image identified as background;
  the intermediate light level, a first intermediate-light maximum bit rate is set for parts of an image identified as foreground and a second intermediate-light maximum bit rate is set for parts of the image identified as background; or
  the high light level, a first high-light maximum bit rate is set for parts of an image identified as foreground and a second high-light maximum bit rate is set for parts of the image identified as background;
  wherein the first low-light maximum bit rate is lower than the first intermediate-light maximum bit rate and wherein the first high-light maximum bit rate is lower than the first intermediate-light maximum bit rate.

13. The method of claim 12, wherein the second low-light maximum bit rate is lower than the second intermediate-light maximum bit rate and wherein the second high-light maximum bit rate is lower than the second intermediate-light maximum bit rate.

14. The method of claim 12, wherein the second low-light maximum bit rate, the second intermediate-light maximum bit rate and the second high-light maximum bit rate are set to be the same maximum bit rate.

15. A bit rate controller for controlling a bit rate for encoding of digital video data, the bit rate controller comprising:
  a light level determination block configured to determine a light level in images of a captured scene based on light level during capturing of the images, wherein a light level scale is discretized into a plurality of distinct light levels comprising at least a low light level, an intermediate light level and a high light level, and wherein a maximum bit rate for encoding the digital video data is associated with each respective distinct light level; and
  a maximum bit rate setting block configured to, upon the light level being determined to be:
    the low light level, set the bit rate for encoding the digital video to a low-light maximum bit rate;
    the intermediate light level, set the bit rate for encoding the digital video to an intermediate-light maximum bit rate; or
    the high light level, set the bit rate for encoding the digital video to a high-light maximum bit rate;
    wherein the low-light maximum bit rate is lower than the intermediate-light maximum bit rate and wherein the high-light maximum bit rate is lower than the intermediate-light maximum bit rate.

16. The bit rate controller according to claim 15, wherein the bit rate controller further comprises a memory comprising a look-up table comprising distinct light levels and the thereto associated respective predetermined maximum bit rates; wherein the setting of the respective maximum bit rate is performed by performing a look-up in the look-up table.

17. The bit rate controller according to claim 16, wherein the difference in light level between two adjacent distinct light levels is at most a doubling of the light level.

18. The bit rate controller according to any one of claim 15, wherein the bit rate controller is arranged in a digital network camera.

19. The bit rate controller according to any one of claim 15, wherein the bit rate controller is configured to service a plurality of digital network cameras, each digital network camera being configured to capture images depicting a camera specific scene, wherein the light level determination block is configured to camera specifically determine the light level in the images of each camera specific scene, and wherein the maximum bit rate setting block is configured to set camera specific low-light maximum bit rates, intermediate-light maximum bit rates and high-light maximum bit rates.

20. The bit rate controller according to claim 19, wherein the bit rate controller is further configured to change the camera specific low-light maximum bit rates, intermediate-light maximum bit rates and high-light maximum bit rates over time.

* * * * *